United States Patent [19]

Ripert

[11] 4,345,738

[45] Aug. 24, 1982

[54] FIRE SAFE SEAL

[75] Inventor: Roger L. Ripert, Concord, Calif.

[73] Assignee: Grove Valve and Regulator Company, Oakland, Calif.

[21] Appl. No.: 180,980

[22] Filed: Aug. 25, 1980

[51] Int. Cl.³ ............................................. F16K 5/00
[52] U.S. Cl. .................................. 251/315; 251/172; 251/317; 137/72; 137/74; 277/213
[58] Field of Search ............... 251/172, 174, 315, 317; 137/72, 74; 277/213

[56] References Cited

U.S. PATENT DOCUMENTS

| | | | |
|---|---|---|---|
| 222,388 | 12/1879 | Doty | 277/213 |
| 3,132,837 | 5/1964 | Britton | 251/172 |
| 3,346,234 | 10/1967 | Allen | 251/317 X |
| 3,401,914 | 9/1968 | Shaud | 251/172 |
| 4,113,268 | 9/1978 | Simmons | 137/74 X |
| 4,286,614 | 9/1981 | Kacal | 251/315 X |

*Primary Examiner*—Harold W. Weakley
*Attorney, Agent, or Firm*—Melvin R. Stidham

[57] ABSTRACT

A fire-safe seal for a valve having a metallic seat ring with a resilient seal ring in a leading face thereof to seal against a valve closure member. A thin, metallic flexible diaphragm is clamped around its outer edges to the body and around its inner edge to the seat ring. An annular sealing ridge, which is concentric to and smaller than the resilient seal, is provided around the face of the seat ring to provide a metal-to-metal seal in the event of destruction of the resilient seal.

6 Claims, 6 Drawing Figures

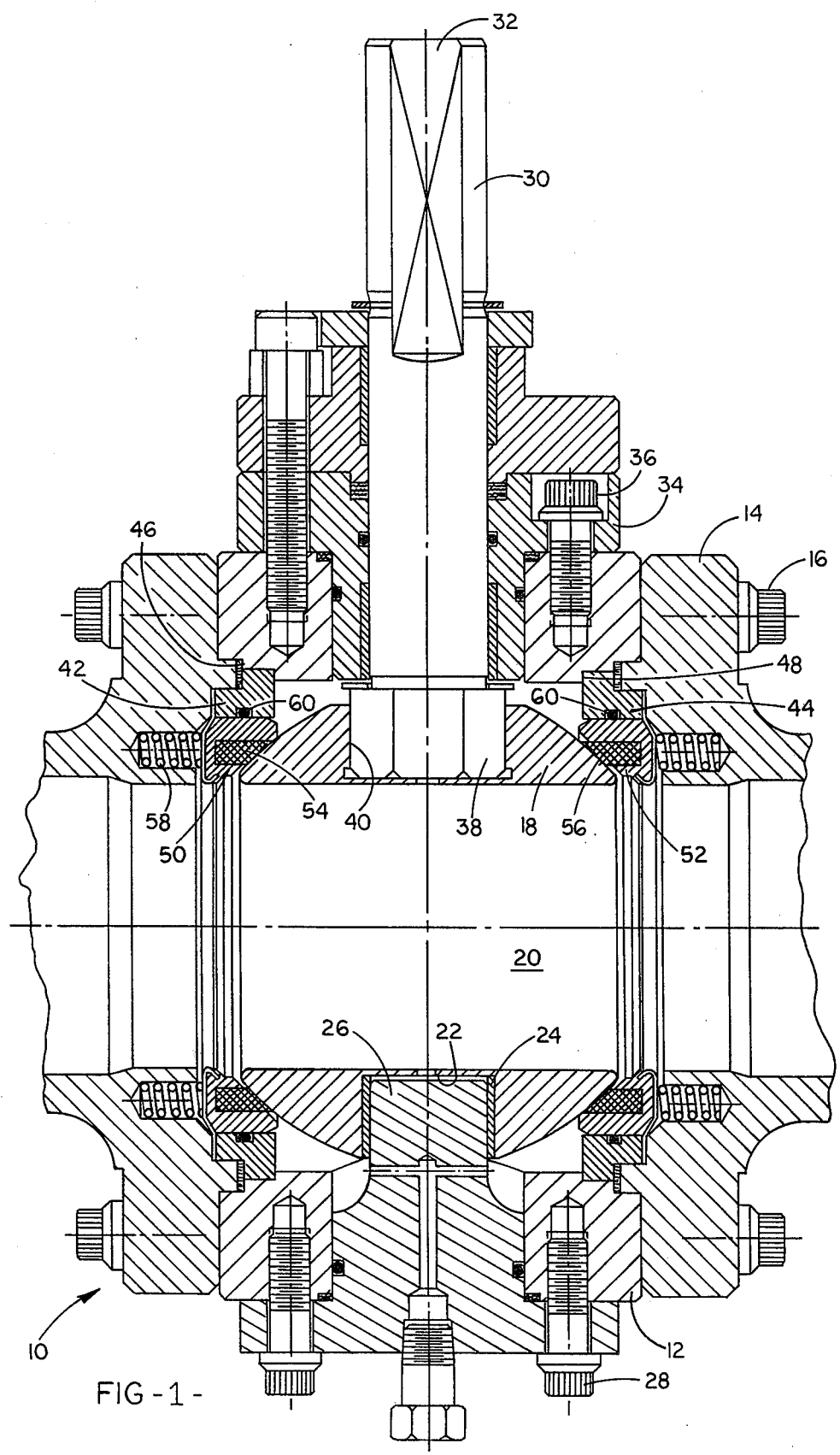
FIG-1-

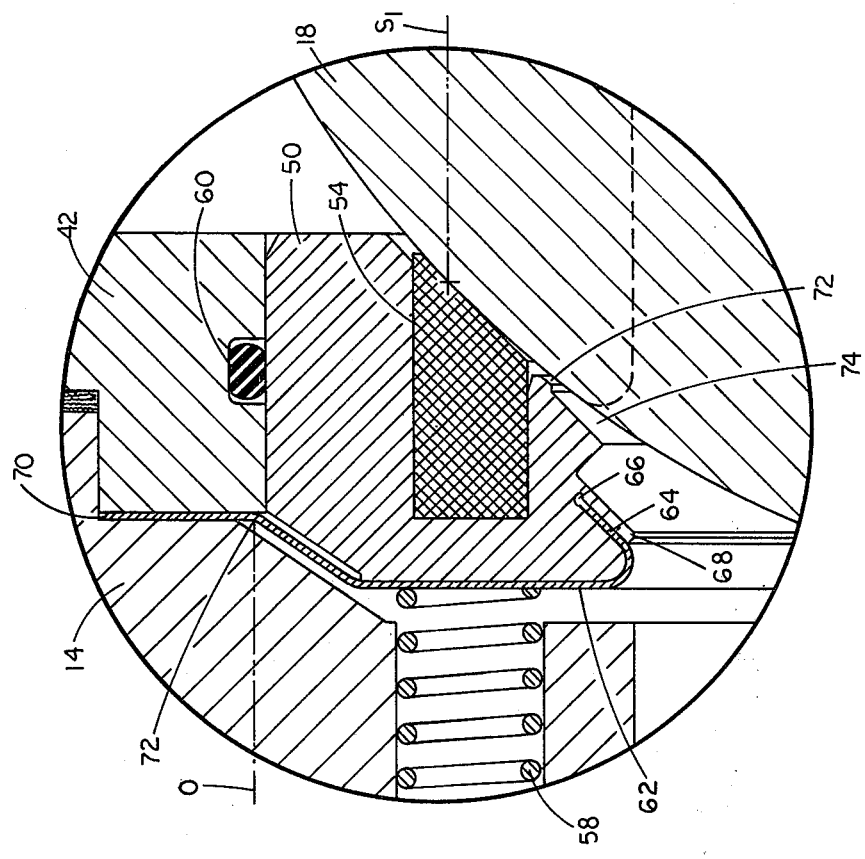
FIG. -2-
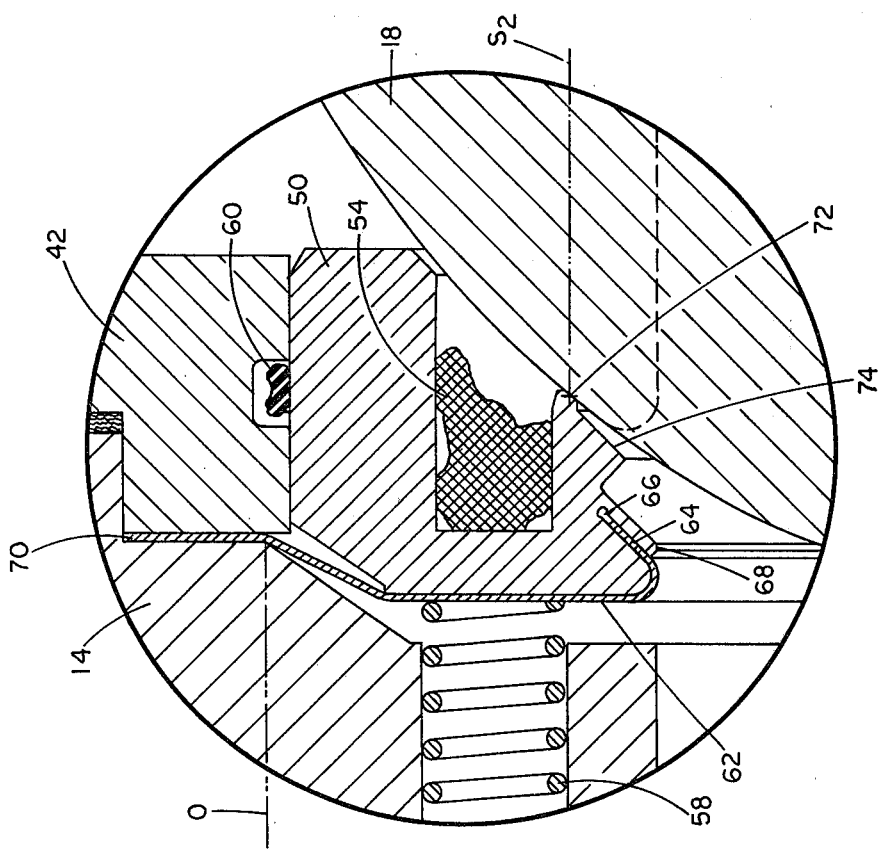
FIG. -3-

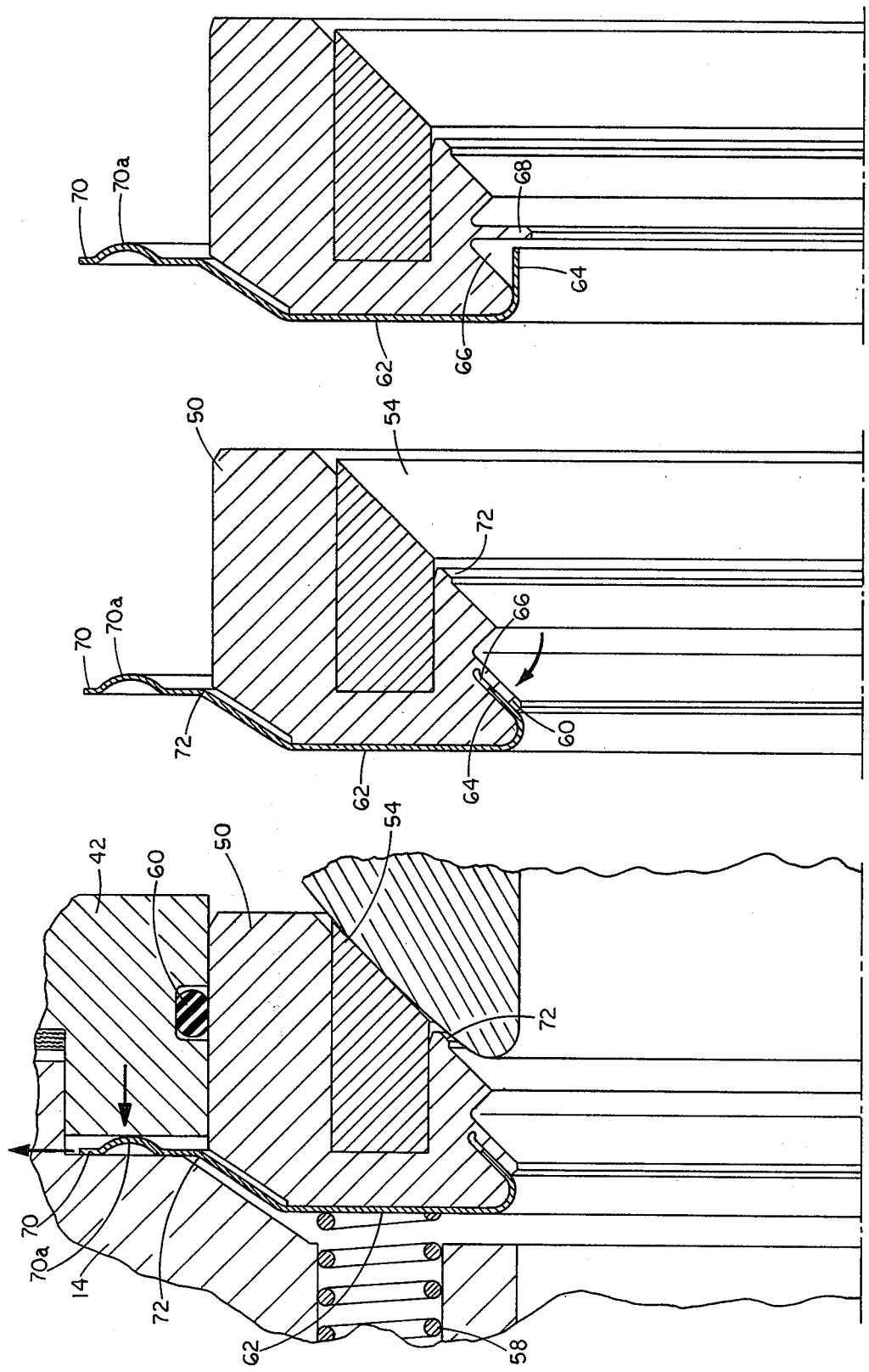

FIRE SAFE SEAL

BACKGROUND OF THE INVENTION

Valves for controlling the flow of liquids and gases often employ main seal rings of resilient materials in order to effect a more fluid-tight seal. However, when such valves are used in pipelines or other fluid flow systems which conduct combustible materials, such seal rings are subject to destruction in the event of fire, when they are needed most from the standpoint of safety. Accordingly, it is highly desirable to prevent flow of the fluid to aid or foster combustion and to keep it confined, in the event of failure of the principal seal.

OBJECTS OF THE INVENTION

It is an object of this invention to provide a metallic seal for a valve which functions in the event the main, resilient seal is destroyed.

It is a further object of this invention to provide a metallic seal which is effective only in the event that the main resilient seal is destroyed.

It is a further object of this invention to provide a metallic seal ring on a pressure-biased seat ring, which normally carries a resilient seal, wherein there is an additional pressure factor introduced should it become necessary to rely upon the metal seal.

Other objects and advantages of this invention will become apparent from the description to follow, particularly when read in conjunction with the accompanying drawing.

SUMMARY OF THE INVENTION

In carrying out this invention, there is provided a seat ring having a recess in the leading face thereof with an resilient seal ring seated therein and protruding therefrom, normally to effect a seal with a closure member. A thin metallic diaphragm is clamped around its outer edges to the valve body and is clamped around its inner edges to the seat ring, thereby to effect a seal between the seat ring and the body. A plurality of springs acting against the back of the seat ring, with the diaphragm interposed between, biases the seat ring against the closure member. However, when the valve is closed, this force is augmented by upstream pressure acting against the back of the seat ring opposed by the pressure against the front of the seat ring out as far as the main seal diameter. Accordingly, over the area radially outward of the seal ring, the line pressure is not balanced, and effects a piston action. Should the main seal be destroyed by fire, the sealing is effected by a sealing ridge on the front face of the seat ring which is concentric to and smaller than the main, resilient seal. Since metal-to-metal seal is on a smaller diameter, the unbalanced pressure effect is over a larger area to generate an increased piston action.

BRIEF DESCRIPTION OF THE DRAWING

In the drawings:

FIG. 1 is a vertical section view of a ball valve including the fire-safe seal of this invention;

FIG. 2 is an enlarged partial section view of the seal ring showing normal sealing operation.

FIG. 3 is an enlarged partial section view of the seal ring after destruction of the main seal; and FIGS. 4, 5 and 6 are enlarged partial section views illustrating steps in the installation of the fire-safe seal.

DESCRIPTION OF A PREFERRED EMBODIMENT

Referring now to FIG. 1 with greater particularity this invention is discussed in conjunction with a ball valve 10 which may include a body band 12 to which end closures 14 are bolted at 16.

A ball 18 having a flow passage therethrough has a socket 22 at the bottom lined by a bearing 24 to be received rotatably on a trunnion 26 which is bolted to the body band at 28. At the top, a valve stem 30, having a flatened portion 32 for a wrench or the like, is rotatably received in a bearing block 34 which is bolted to the body band at 36. The lower end of the stem 30 is of polygonal cross-section to be received in a complementary socket 40 in the ball so that rotation of the stem 30 will produce rotation of the ball 18.

A pair of body rings 42 and 44 are received in recesses 46 and 48 in the body band 12, and clamped therein by the end closures 14. Slidable inside the body rings 42 and 44 are seat rings 50 and 52 which carry resilient seals 54 and 56 to seal against the ball 18, sealing contact initially being effected by springs 58. An O-ring 60 may be carried in the body rings 42 and 44 to seal against the outer surface of the seat rings 50 and 52.

Referring now to FIG. 2, a thin, annular flexible metallic diaphragm 62 is clamped at its inner edges 64 to the seat ring 50, being securely held in a groove 66 by a thin lip 68, which is pressed against it. The outer portions of the diaphragm 62 are clamped between the end closure 14 and the body ring 42. Hence, the diaphragm 62 forms a complete seal between the seat ring 50 and the valve body 12, 14 actually rendering the O-ring seal 60 redundant. Formed at the front of the seat ring is relatively narrow sealing ridge 72 which protrudes from the leading face 74 of the seat ring 50. However, in normal operation the resilient seal 54 protrudes even further, so that the sealing ridge 72 is normally inactive.

In normal operation, the springs 58 biases the seat ring forward for initial sealing contact. Then, with the valve closed as illustrated, an effective sealing contact point $S_1$ is established some place across the face of the seal. Within this effective sealing circle line pressure acting on the seat ring 50, front and back is balanced, but on the upstream side of the valve, the pressure in the pipeline acting against the back of the seat ring over the annular area between that effective sealing circumference $S_1$, and an outer circumference O approximately at 72 where the diaphragm 62 bends out of contact with the body ring 42, is opposed only by a considerably lower pressure within the valve body 12. Hence, a very effective piston action is generated.

Referring now to FIG. 3, in the event of destruction of the seal 54, the springs 58 and fluid pressure together drive the seat ring 50 forward to bring the sealing ridge 72 into sealing contact with the ball 18, so the effective sealing circle $S_2$ now moves inward to a location within the area of the sealing ridge 72. Therefore the area of unbalanced pressure increases to augment the piston action, when the metal-to-metal fire-safe emergency seal 72 is brought into effect.

Referring now to FIGS. 4, 5 and 6, there are shown the steps in application of the metal diaphragm 62. As stamped, the diaphragm has an inner flange portion 64 and an outer clamping portion 70 with a bead 70a formed therein to augment sealing when clamped. The diaphragm 62 is bent back at 72 around the back of the seat ring 50.

When the diaphragm is placed as shown in FIG. 2, the thin lip 68 or the seat ring 52 is crimped over, as indicated, to clamp the inner edges 64 of the diaphragm firmly. Finally, the seat ring is installed within the body ring 42 and the end closure 14, with springs 58 in place, is bolted to the body band by bolts 16 (FIG. 1) to clamp the outer portions 70, flattening out the bead 70a, as shown in FIG. 3.

While this invention has been described in conjunction with a preferred embodiment thereof, it is obvious that modifications and changes therein may be made by those skilled in the art to which it pertains, without departing from the spirit and scope of this invention, as defined by the claims appended hereto.

What is claimed is:

1. In a valve having a valve body, a closure member mounted in said body for movement between open and closed positions, an internal cylindrical surface in said body adjacent to said closure member, a metallic seat ring slidable in said internal surface, an annular recess in the leading face of said seat ring, a resilient seal ring in and protruding from said recess to seal off fluid flow when urged against said closure member and biasing means urging said seat ring against said closure member; a fire safe seal comprising:
    a thin, flexible, annular metallic diaphragm sealed at its outer periphery to said body and at its inner edge to said seat ring;
    said diaphragm being interposed between said seat ring and said biasing means; and
    a narrow metallic annular sealing ridge integral with and around the leading face of said seat ring within the area circumscribed by said annular recess.
    said sealing ridge protruding from said leading face so as to engage against said closure member in absence of said sealing ring while a clearance remains between said closure member and the remainder of said leading face.

2. The fire-safe seal defined by claim 1 including:
    a body ring concentric with said seat ring;
    the inner surface of said body ring forming said internal surface;
    opposing means in said body clamping against the trailing and leading faces of said body ring;
    the outer portions of said diaphragm being clamped between one of said opposing means and said body ring.

3. The fire-safe seal defined by claim 2 wherein said valve body comprises:
    a body band and end closures with flow passages therethrough bolted to said body band; and including:
    a cylindrical recess in said body band adjacent one edge thereof;
    said body ring being received in said recess and clamped therein by one of said end closures;
    said outer portions being clamped between said end closures and said body ring.

4. The fire-safe seal defined by claim 2 including:
    an annular bead formed around said outer portions prior to clamping.

5. The fire-safe seal defined by claim 1 including:
    a groove in said seal ring receiving the inner edge of said diaphragm;
    the sides of said groove firmly gripping said inner edge.

6. The fire-safe seal defined by claim 5 including:
    a thin lip around said seat ring forming one side of said groove; said lip being crimped over to clamp firmly around said inner edge.

* * * * *